(12) United States Patent
Son et al.

(10) Patent No.: US 9,540,865 B2
(45) Date of Patent: Jan. 10, 2017

(54) VACUUM GLASS INCLUDING PILLARS HAVING DIFFERENT ARRANGEMENT DISTANCES, AND METHOD FOR MANUFACTURING SAME

(75) Inventors: Beom Goo Son, Suwon-si (KR); Su Bin Song, Uiwang-si (KR); Youn Ki Jun, Gwacheon-si (KR)

(73) Assignee: LG HAUSYS, LTD., Seoul (KR)

(*) Notice: Subject to any disclaimer, the term of this patent is extended or adjusted under 35 U.S.C. 154(b) by 315 days.

(21) Appl. No.: 14/238,970

(22) PCT Filed: Aug. 13, 2012

(86) PCT No.: PCT/KR2012/006451
§ 371 (c)(1),
(2), (4) Date: Feb. 14, 2014

(87) PCT Pub. No.: WO2013/032153
PCT Pub. Date: Mar. 7, 2013

(65) Prior Publication Data
US 2014/0212605 A1    Jul. 31, 2014

(30) Foreign Application Priority Data

Aug. 30, 2011   (KR) .................. 10-2011-0087226

(51) Int. Cl.
*E06B 3/663*     (2006.01)
*E06B 3/677*     (2006.01)
(Continued)

(52) U.S. Cl.
CPC .............. *E06B 3/677* (2013.01); *C03C 27/10* (2013.01); *E06B 3/6612* (2013.01);
(Continued)

(58) Field of Classification Search
CPC .... E06B 3/677; E06B 3/6612; E06B 3/66304; E06B 3/67326; Y02B 80/22; Y02B 80/24
See application file for complete search history.

(56) References Cited

U.S. PATENT DOCUMENTS

| | | | |
|---|---|---|---|
| 7,306,833 B2 * | 12/2007 | Martin | ................... E06B 3/6612 345/49 |
| 2013/0273296 A1 * | 10/2013 | Jeon | ....................... C03B 23/245 428/69 |

FOREIGN PATENT DOCUMENTS

| | | | |
|---|---|---|---|
| JP | 06087633 A | 3/1994 | |
| JP | 07508967 A | 10/1995 | |

(Continued)

OTHER PUBLICATIONS

International Search Report for PCT/KR2012/006451 mailed on Feb. 19, 2013.
Korean Notice of Allowance dated Mar. 25, 2014.

*Primary Examiner* — Donald J Loney
(74) *Attorney, Agent, or Firm* — Hauptman Ham, LLP (57) ABSTRACT

Provided in the present invention is a vacuum glass, comprising: a plurality of plate glasses arranged to be spaced apart at fixed distances; a sealing material provided along edges of the plate glasses to seal and adhere to the plate glasses; and a plurality of pillars arranged between the plate glasses to maintain the distances between the plate glasses. The plurality of pillars are arranged at different arrangement distances in vertical and horizontal directions. Thus, the thermal insulation performance of the vacuum glass may be improved, and stress applied to the vacuum glass may be reduced by the pillars to secure the safety of a product.

11 Claims, 5 Drawing Sheets

(51) Int. Cl.
  *C03C 27/10* (2006.01)
  *E06B 3/66* (2006.01)
  *E06B 3/673* (2006.01)
(52) U.S. Cl.
  CPC ...... *E06B 3/66304* (2013.01); *E06B 3/67326* (2013.01); *Y02B 80/24* (2013.01)

(56) References Cited

FOREIGN PATENT DOCUMENTS

| | | | |
|---|---|---|---|
| JP | 11209149 | A | 8/1999 |
| JP | 11228189 | A | 8/1999 |
| JP | 11322377 | A | 11/1999 |
| JP | 2002531375 | A | 9/2002 |
| JP | 2003321256 | A | 11/2003 |
| JP | 2004352566 | A | 12/2004 |
| KR | 100496898 | B1 | 6/2005 |
| KR | 20070009219 | A | 1/2007 |
| KR | 100957667 | B1 | 5/2010 |
| KR | 20110069714 | A | 6/2011 |

* cited by examiner

VACUUM GLASS INCLUDING PILLARS HAVING DIFFERENT ARRANGEMENT DISTANCES, AND METHOD FOR MANUFACTURING SAME

TECHNICAL FIELD

The present invention relates to a vacuum glass, and more particularly, to a vacuum glass including pillars having different arrangement distances to minimize stress applied to the vacuum glass.

BACKGROUND ART

In buildings, energy consumed in heating and cooling occupies about 25 percent of total energy consumption.

Further, energy loss through windows and doors reaches about 35% of the total energy consumption. This is because the windows and doors have a coefficient of overall heat transmission 2 to 5 times higher than those of walls or roofs and are thus the weakest part of an outer cover of the building in terms of thermal insulation. Accordingly, it has been required to develop windows and doors excellent in thermal insulation with a coefficient of overall heat transmission similar to those of the walls in terms of nationwide energy conservation as well as energy conservation in buildings.

In general, a window or door includes a frame forming a shape of the window or door, and a glass sheet coupled to the frame. In the window or door, thermal energy generally leaks through the glass sheet that occupies the largest area of the window or door. Accordingly, a vacuum glass capable of significantly reducing leakage of thermal energy has been spotlighted.

A vacuum glass includes a vacuum layer between two panes and can minimize thermal loss due to conduction, convection and radiation of gas when used together with a low-E glass.

In the vacuum glass, a pillar for maintaining a distance between the panes is used to form the vacuum layer. Since the vacuum glass is configured to have the vacuum layer in an inner space, external force can be applied to the panes due to difference in pressure between an inner space under a vacuum and an outer space under atmospheric pressure. External force applied to the panes is concentrated on a portion of the pane adjoining the pillar, and acts as stress.

Typically, the pillars are densely arranged in a square shape in order to distribute stress. However, dense arrangement of the pillars causes deterioration in thermal insulation due to thermal conduction of many pillars.

Further, if an arrangement distance in the square shape is increased in order to reduce the number of pillars causing degradation of thermal insulation, stress applied to the vacuum glass increases and can cause breakage of the vacuum glass during manufacture, transport and use of the vacuum glass.

DISCLOSURE

Technical Problem

An aspect of the present invention is to provide a vacuum glass, which can reduce stress applied to a pane due to pillars and provide satisfactory thermal insulation, and a method of manufacturing the same.

Technical Solution

In accordance with one aspect of the present invention, a vacuum glass includes: a plurality of panes separated a predetermined distance from each other; a sealing material disposed along edges of the panes and sealing a space between the panes while bonding the panes to each other; and a plurality of pillars interposed between the panes and maintaining the distance between the panes, the plurality of pillars being arranged to have different arrangement distances between vertical and horizontal directions.

The plurality of pillars may be arranged such that a ratio of long arrangement distance LL to short arrangement distance LS satisfies LL/LS>1 and LL/LS≤3.

The plurality of pillars may be arranged in a rectangular shape and may have an arrangement density Pa, corresponding to the number of pillars per square centimeter, in the range of 0.11≤Pa≤0.44.

Each of the panes may have a thickness of 3 mm to 5 mm.

In accordance with another aspect of the present invention, a method of manufacturing a vacuum glass, in which a plurality of pillars are arranged between panes and edges of the panes are sealed by a sealing material to seal a decompressed inner space between the panes, includes: arranging the plurality of pillars to have different arrangement distances between horizontal and vertical directions.

The plurality of pillars may be arranged such that a ratio of long arrangement distance LL to short arrangement distance LS satisfies LL/LS>1 and LL/LS≤3.

The plurality of pillars may be arranged in a rectangular shape.

Advantageous Effects

According to the present invention, there are provided a vacuum glass and a method of manufacturing the same, in which a plurality of pillars has different arrangement distances between horizontal and vertical directions such that stress applied to the vacuum glass due to the pillars can be reduced while providing satisfactory thermal insulation, thereby securing stability of a product.

BEST MODE

Hereinafter, a vacuum glass and a method of manufacturing the same according to exemplary embodiments of the invention will be described in more detail with reference to the accompanying drawings.

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and thorough understanding of the present invention by those skilled in the art. The scope of the present invention is defined only by the claims. Like elements will be denoted by like reference numerals throughout the specification.

Further, the sizes of the elements that constitute the embodiments in the drawings may be exaggerated for clarity. If a certain element is described as being "disposed in" or "connected to" another element, the certain element may be in contact with or separated a predetermined distance from the other element. When the elements are separated a predetermined distance from each other, a description of a third element for fastening or connecting the elements to each other can be omitted.

Figure 1:
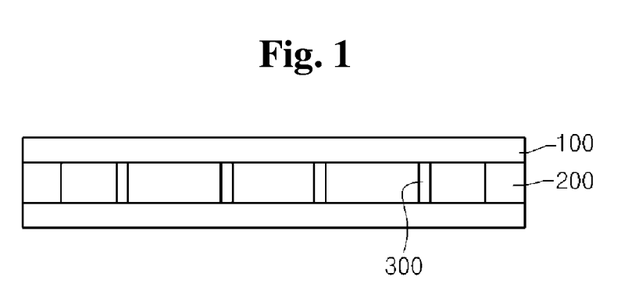
FIG. 1 is a vertical cross-sectional view of a vacuum glass according to one embodiment of the present invention.

FIG. 1 is a vertical cross-sectional view of a vacuum glass according to one embodiment of the present invention. Prior to the description of the vacuum glass according to this embodiment, a typical vacuum glass will be described in brief.

The vacuum glass includes a plurality of panes 100, a sealing material 200, and pillars 300.

To maintain a distance for forming a vacuum layer between the panes 100, the pillars 300 are interposed between the panes 100. Further, the sealing material 200 is applied to edges of the pane 100 to seal an inner space between the panes 100 in order to prevent external gas from entering the inner space, and the inner space is evacuated through an exhaust hole formed at an upper portion of one of the panes 100. After evacuation, the exhaust hole is sealed to keep the inner space in a vacuum.

According to the present invention, the vacuum glass has different arrangement distances of the pillars 300 between horizontal and vertical directions.

Figure 2:
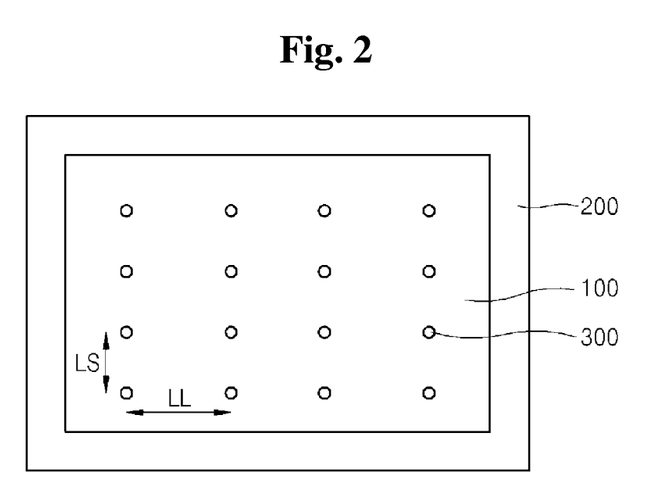
FIG. 2 is a horizontal cross-sectional view of a vacuum glass according to the embodiment of the present invention.

FIG. 2 is a horizontal cross-sectional view of the vacuum glass according to the embodiment of the present invention. Referring to FIG. 2, in the vacuum glass according to the embodiment of the invention, the plurality of pillars 300 is regularly arranged, and the horizontal arrangement distance between the pillars 300 is different from the vertical arrangement distance between the pillars 300.

As the plurality of pillars 300 are arranged to have different arrangement distances, stress applied to the vacuum glass due to the pillars 300 is more reduced than in the case where the pillars are arranged in a square shape to have the same arrangement distance. With this configuration, not only are fewer pillars 300 used in the vacuum glass, but also stress applied to the vacuum glass is reduced, thereby ensuring improved thermal insulation and durability of final products.

In the vacuum glass according to the embodiment, the plurality of pillars 300 is arranged to have different arrangement distances between the horizontal and vertical directions. Thus, the arrangement distances may be divided into a long arrangement distance LL and a short arrangement distance LS. The long arrangement distance may be either of a horizontal arrangement distance or a vertical arrangement distance in accordance with a use aspect of the vacuum glass or arranged directions of the pillars 300.

The plurality of pillars 300 may be arranged such that a ratio of the long arrangement distance LL to the short arrangement distance LS satisfies 1<LL/LS≤3. Since the pillars 300 are arranged to have different arrangement distances, the ratio is not provided as LL/LS=1, that is, no two arrangement distances are equal. If LL/LS>3, the space between the panes 100 supported by the pillar 300 may vary depending on the presence of the pillar 300, thereby providing non-uniform thermal insulation.

According to the invention, the plurality of pillars 300 may be arranged in various forms so long as they have difference arrangement distances. In one embodiment, the plurality of pillars 300 may be disposed in a rectangular arrangement. In another embodiment, the plurality of pillars 300 may be disposed in a rhombus arrangement.

Although the pillars 300 are arranged to maintain the space between the pair of panes 100 in the vacuum glass, the pillars 300 can deteriorate thermal insulation since the pillars connect the pair of panes 100 to each other in the vacuum layer and have high thermal conductivity. Therefore, the number of pillars 300 used in the vacuum glass can directly affect thermal insulation.

The pillars 300 according to the present invention may have an arrangement density Pa in the range of 0.11≤Pa≤0.44. Here, the arrangement density refers to the number of pillars 300 per square centimeter (i.e., (EA/cm$^2$).

If the arrangement density Pa of the pillar 300 is less than 0.11, external force due to difference in pressure between the inner space and an external space is focused on a relatively small number of pillars 300. In this case, stress applied to the vacuum glass due to the pillar 300 increases and the vacuum glass is likely to break. Further, the arrangement distance between the pillars 300 can increase and the space between the panes 100 can vary depending on the presence of the pillar 300, thereby causing non-uniform thermal insulation. On the other hand, if the arrangement density Pa of the pillar 300 is greater than 0.44, the vacuum glass cannot provide sufficient thermal insulation due to thermal conductivity of the pillars 300 although many pillars 300 maintaining the distance between the panes 100 can decrease external force acting on each pillar 300, thereby reducing stress applied to the vacuum glass.

In the vacuum glass according to the present invention, the panes 100 may have a thickness of 3 mm to 5 mm in consideration of stress and thermal insulation.

If the thickness of the panes 100 is less than 3 mm, not only is thermal insulation deteriorated but also the panes 100 are likely to break due to stress applied from the pillars 300. On the other hand, if the thickness of the pane 100 is greater than 5 mm, the weight and thickness of the product are increased to be economically infeasible and restrict a variety of designs although thermal insulation and durability of the vacuum glass can be improved.

Next, a method of manufacturing a vacuum glass according to one embodiment of the present invention will be described.

Prior to the description of the method of manufacturing a vacuum glass according to the embodiment of the invention, a typical method of manufacturing a vacuum glass will be described in brief.

Pillars 300 are arranged on one pane 100 previously subjected to cleaning, and a sealing material 200 is deposited along a periphery of the pane 100. Another pane 100 is attached to an upper side of the pane 100 having the sealing material 200 deposited thereon, and the sealing material 200 is melt to seal an inner space between the panes 100 while bonding the panes 100 to each other.

To form a vacuum in the inner space between the sealed panes 100, the inner space is evacuated through an exhaust hole formed in one of the panes 100, followed by sealing the exhaust hole, thereby manufacturing a vacuum glass.

In the method of manufacturing a vacuum glass according to the embodiment of the invention, arrangement distances between the pillars 300 are different between horizontal and vertical directions.

As the plural pillars 300 are arranged to have different arrangement distances, stress applied to the vacuum glass due to the pillars 300 is more reduced than in the case in which the pillars are arranged in a square shape to have the same arrangement distance. With this configuration, not only are fewer pillars 300 used in the vacuum glass, but also stress applied to the vacuum glass is reduced, thereby ensuring improved thermal insulation and durability of finished products.

The pillars 300 may be arranged such that a ratio of the long arrangement distance LL to the short arrangement distance LS satisfies 1<LL/LS≤3.

Further, in operation of arranging the plurality of pillars 300, the plurality of pillars 300 may be arranged in various forms so long as they have difference arrangement distances. In one embodiment, the plurality of pillars 300 may be disposed in a rectangular arrangement.

MODE FOR INVENTION

Examples

Next, the present invention will be explained in more detail with reference to some examples. However, it should be understood that these examples are provided for illustration only and are not to be in any way construed as limiting the present invention.

A description of details apparent to those skilled in the art will be omitted.

1. Manufacturing Conditions

A vacuum glass according to one example was manufactured as follows.

In the vacuum glass, pillars 300 were interposed between a pair of panes 100 in a thickness direction. The pair of panes 100 was bonded to each other at peripheries thereof and hermetically sealed.

2. Test Conditions

Under conditions that an inner space between the panes 100 was set to a pressure of less than $1.0 \times 10^{-3}$ torr$^{-3}$ and an outer space was set to have atmospheric pressure of 760 torr, stress applied from the atmospheric pressure to surfaces of the upper and lower pillars 300 was measured.

Test Example 1

Stress Measured at Pa=0.11

Figure 3:
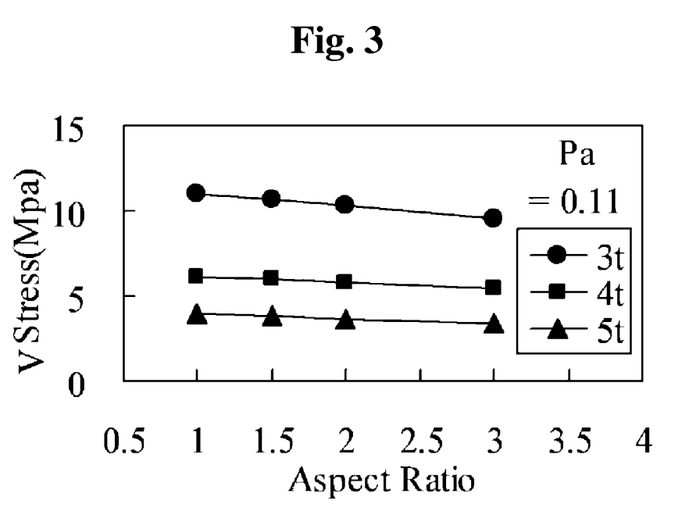
FIGS. 3 to 5 are graphs depicting measurement results of stress applied to surfaces of panes according to arrangement distance ratio of pillars and thickness of the panes in different arrangement densities of the pillars.

FIG. 3 is a graph showing measurement results of stress applied to the surfaces of the panes according to the arrangement distance ratio of the pillars and the thickness of the pane, with the pillars arranged in an arrangement density Pa of 0.11. Table 1 shows test results. The following description will be based on FIG. 3 and Table 1.

TABLE 1

| | Arrangement distance ratio of pillars (LL/LS) | Thickness of pane (mm) | Maximum stress on pane (MPa) |
|---|---|---|---|
| Comparative example 1 | 1 | 3 | 12 |
| Example 1 | 1.5 | 3 | 10.5 |
| Example 2 | 2 | 3 | 9.5 |
| Example 3 | 3 | 3 | 8.5 |
| Comparative Example 2 | 1 | 4 | 7 |
| Example 4 | 1.5 | 4 | 6.5 |
| Example 5 | 2 | 4 | 6 |
| Example 6 | 3 | 4 | 5 |
| Comparative Example 3 | 1 | 5 | 4 |
| Example 7 | 1.5 | 5 | 3.5 |
| Example 8 | 2 | 5 | 3 |
| Example 9 | 3 | 5 | 2 |

In these examples and comparative examples, it could be seen that, assuming that the prepared panes have the same thickness, stress applied to the panes 100 prepared in Examples 1 to 9, in which the long and short arrangement distances of the pillars 300 were clearly distinguished, that is, in which the pillars 300 were arranged at different intervals, was lower than stress applied to the panes prepared in Comparative Examples 1 to 3 in which the arrangement distances of the pillars 300 were equal. That is, stress applied to the panes 100 was gradually decreased as the arrangement distance ratio (LL/LS) increased above 1. Further, stress applied to the panes 100 was changed depending on the thickness of the panes 100.

Test Example 2

Stress Measured at Pa=0.25

Figure 4:
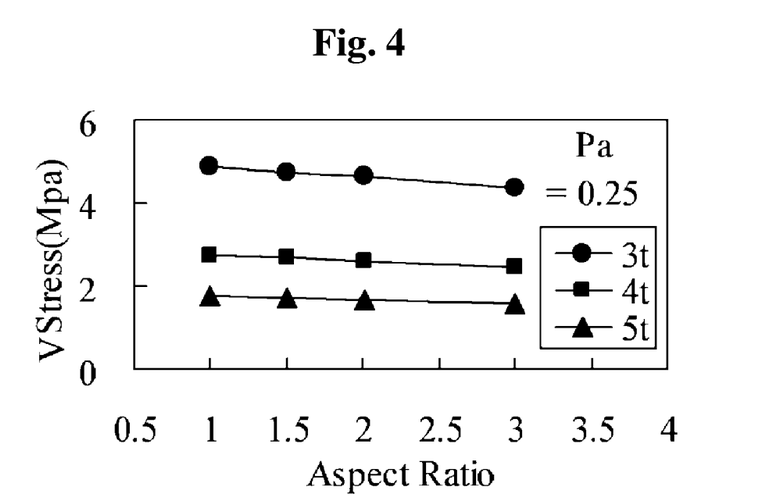

FIG. 4 is a graph showing measurement results of stress applied to the surfaces of the panes according to arrangement distance ratios of the pillars and the thickness of the pane, with the pillars arranged in an arrangement density Pa of 0.25. Table 2 shows test results. The following description will be based on FIG. 4 and Table 2.

TABLE 2

| | Arrangement distance ratio of pillars (LL/LS) | Thickness of pane (mm) | Maximum stress on pane (MPa) |
|---|---|---|---|
| Comparative Example 1 | 1 | 3 | 5 |
| Example 1 | 1.5 | 3 | 4.8 |
| Example 2 | 2 | 3 | 4.6 |
| Example 3 | 3 | 3 | 4.3 |
| Comparative Example 2 | 1 | 4 | 2.8 |
| Example 4 | 1.5 | 4 | 2.7 |
| Example 5 | 2 | 4 | 2.6 |
| Example 6 | 3 | 4 | 2.4 |
| Comparative Example 3 | 1 | 5 | 1.8 |
| Example 7 | 1.5 | 5 | 1.7 |
| Example 8 | 2 | 5 | 1.65 |
| Example 9 | 3 | 5 | 1.55 |

In these examples and comparative examples, it could be seen that, assuming that the prepared panes have the same thickness, stress applied to the panes 100 prepared in Examples 1 to 9, in which the long and short arrangement distances of the pillars 300 were distinguished, was lower than stress applied to the panes prepared in Comparative Examples 1 to 3 in which the arrangement distances of the pillars 300 were equal. That is, stress applied to the panes 100 was gradually decreased as the arrangement distance ratio increased above 1. Further, stress applied to the panes 100 was changed depending on the thickness of the panes 100.

Test Example 3

Stress Measured at Pa=0.44

Figure 5:
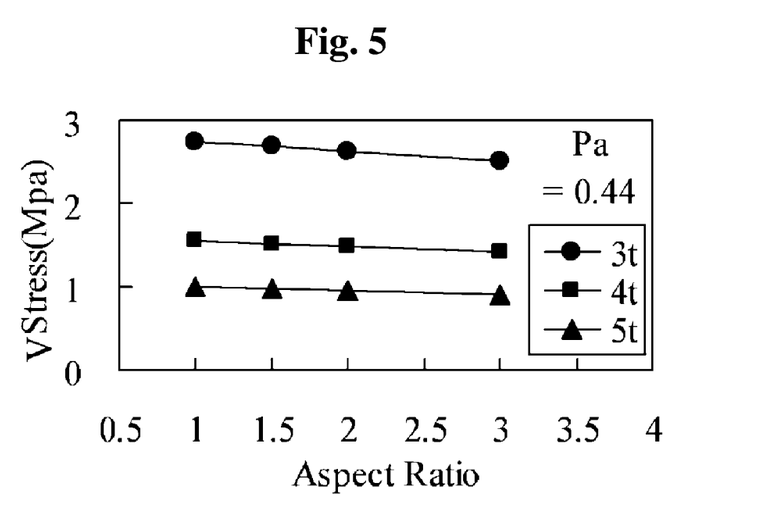

FIG. 5 is a graph showing measurement results of stress applied to the surfaces of the panes according to arrangement distance ratios of the pillars and the thickness of the pane, with the pillars arranged in an arrangement density Pa of 0.44. Table 3 shows test results. The following description will be based on FIG. 5 and Table 3.

TABLE 3

| | Arrangement distance ratio of pillars (LL/LS) | Thickness of pane (mm) | Maximum stress on pane (MPa) |
|---|---|---|---|
| Comparative Example 1 | 1 | 3 | 2.8 |
| Example 1 | 1.5 | 3 | 2.7 |
| Example 2 | 2 | 3 | 2.6 |
| Example 3 | 3 | 3 | 2.5 |
| Comparative Example 2 | 1 | 4 | 1.5 |
| Example 4 | 1.5 | 4 | 1.4 |
| Example 5 | 2 | 4 | 1.35 |
| Example 6 | 3 | 4 | 1.3 |
| Comparative Example 3 | 1 | 5 | 1 |
| Example 7 | 1.5 | 5 | 0.9 |
| Example 8 | 2 | 5 | 0.85 |
| Example 9 | 3 | 5 | 0.8 |

In these examples and comparative examples, it could be seen that, assuming that the prepared panes have the same thickness, stress applied to the pane 100 prepared in Examples 1 to 9, in which the long and short arrangement distances of the pillars 300 were clearly distinguished, was lower than stress applied to the panes prepared in Comparative Examples 1 to 3 in which the arrangement distances of the pillars 300 were equal. That is, stress applied to the panes 100 was gradually decreased as the arrangement distance ratio (LL/LS) increased above 1. Further, stress applied to the pane 100 was changed depending on the thickness of the panes 100.

In Test Examples 1 to 3, stress applied to the panes 100 was measured in accordance with the arrangement density Pa of the pillars 300. As a result, it could be seen that stress applied to the panes 100 varied depending on the arrangement density of the pillars 300.

Although some embodiments have been described herein with reference to the accompanying drawings, it should be understood that these embodiments are given by way of illustration only, and that various modifications, variations, and alterations can be made without departing from the spirit and scope of the present invention. Therefore, the scope of the present invention should be limited only by the accompanying claims and equivalents thereof.

The invention claimed is:

1. A vacuum glass comprising:
a plurality of panes separated a predetermined distance from each other;
a sealing material disposed along edges of the panes and sealing a space between the panes while bonding the panes to each other; and
a plurality of pillars interposed between the panes and maintaining the distance between the panes, the plurality of pillars being arranged to have different arrangement distances between vertical and horizontal directions,
wherein the plurality of pillars has an arrangement density Pa, corresponding to the number of pillars per square centimeter, in the range of $0.25 \leq Pa \leq 0.44$, and a maximum stress at contact surfaces of each pillar to the panes is 4.8 MPa or less under a condition that an inner space between the panes is set to a pressure of less than $1.0 \times 10^{-3}$ torr$^{-3}$ and an outer space is set to at an atmospheric pressure of 760 torr.

2. The vacuum glass according to claim 1, wherein the pillars are arranged such that a ratio of long arrangement distance LL to short arrangement distance LS satisfies LL/LS>1.

3. The vacuum glass according to claim 1, wherein the pillars are arranged such that a ratio of long arrangement distance LL to short arrangement distance LS satisfies LL/LS≤3.

4. The vacuum glass according to claim 1, wherein the pillars are disposed in a rectangular arrangement.

5. The vacuum glass according to claim 1, wherein each of the panes has a thickness of 3 mm to 5 mm.

6. A method of manufacturing a vacuum glass, in which a plurality of pillars are arranged between panes and edges of the panes are sealed by a sealing material to seal a decompressed inner space between the panes, the method comprising:
arranging the plurality of pillars to have different arrangement distances between horizontal and vertical directions,
wherein the plurality of pillars has an arrangement density Pa, corresponding to the number of pillars per square centimeter, in the range of $0.25 \leq Pa \leq 0.44$, and a maximum stress at contact surfaces of each pillar to the panes is 4.8 MPa or less under a condition that the decompressed inner space between the panes is set to a pressure of less than $1.0 \times 10^{-3}$ torr$^{-3}$ and an outer space is set to at an atmospheric pressure of 760 torr.

7. The method according to claim 6, wherein the pillars are arranged such that a ratio of long arrangement distance LL to short arrangement distance LS satisfies LL/LS>1.

8. The method according to claim 6, wherein the pillars are arranged such that a ratio of long arrangement distance LL to short arrangement distance LS satisfies LL/LS≤3.

9. The method according to claim 6, wherein the pillars are disposed in a rectangular arrangement.

10. the vacuum glass according to claim 1, wherein at least one of the pillars of the plurality of pillars is cylindrical.

11. The vacuum glass according to claim 1, wherein the pillars are arranged such that a ratio of long arrangement distance LL to short arrangement distance LS satisfies 1.5<LL/LS≤3.

* * * * *